(12) United States Patent
Stoica et al.

(10) Patent No.: US 9,300,729 B1
(45) Date of Patent: Mar. 29, 2016

(54) DISTRIBUTING INFORMATION OVER A NETWORK

(71) Applicant: Conviva Inc., San Mateo, CA (US)

(72) Inventors: Ion Stoica, Piedmont, CA (US); Hui Zhang, Pittsburgh, PA (US); Steven R. Mccanne, Berkeley, CA (US); Jibin Zhan, Pittsburgh, PA (US); Aditya R. Ganjam, San Francisco, CA (US)

(73) Assignee: Conviva Inc., Foster City, CA (US)

( * ) Notice: Subject to any disclaimer, the term of this patent is extended or adjusted under 35 U.S.C. 154(b) by 0 days.

(21) Appl. No.: 14/295,252

(22) Filed: Jun. 3, 2014

Related U.S. Application Data

(63) Continuation of application No. 11/800,413, filed on May 4, 2007, now Pat. No. 8,775,512.

(60) Provisional application No. 60/859,428, filed on Nov. 15, 2006.

(51) Int. Cl.
*H04L 12/28* (2006.01)
*H04L 29/08* (2006.01)

(52) U.S. Cl.
CPC ..................................... *H04L 67/10* (2013.01)

(58) Field of Classification Search
CPC ............ H04L 41/0813; H04L 41/5025; H04L 41/5009
USPC ........... 709/217, 219, 220; 370/338, 389, 400
See application file for complete search history.

(56) References Cited

U.S. PATENT DOCUMENTS

| | | | |
|---|---|---|---|
| 2004/0233918 A1* | 11/2004 | Larsson ................. | H04B 7/155 370/400 |
| 2005/0086469 A1* | 4/2005 | Dunagan et al. .............. | 713/163 |
| 2005/0243735 A1* | 11/2005 | Kashima ............... | H04W 40/20 370/254 |

OTHER PUBLICATIONS

"Simple Opportunistic Routing Protocol for Wireless Mesh Networks"—Rozner et al, University of Texas at Austin, Aug. 2011 http://ericrozner.com/papers/wimesh06.pdf.*

* cited by examiner

*Primary Examiner* — Randy Scott
(74) *Attorney, Agent, or Firm* — Van Pelt, Yi & James LLP

(57) ABSTRACT

Distributing information over a network is disclosed. Nodes are grouped into regions. Preferred nodes are designated. A source of content to be delivered to a preferred node using a preferred algorithm is indicated to at least one preferred node. At least one common node is assigned the preferred node as a relay of information.

84 Claims, 9 Drawing Sheets

900

| Client ID |
| Heartbeat Seq |
| Local Timestamp |
| P1 |
| ... |
| Pk |
| C1 |
| ... |
| Cm |
| Buffer Size S1 |
| ... |
| Buffer Size Sk |
| Timestamp TP1 |
| ... |
| Timestamp TPk |
| Timestamp CT1 |
| ... |
| Timestamp CTm |

FIG. 9

DISTRIBUTING INFORMATION OVER A NETWORK

CROSS REFERENCE TO OTHER APPLICATIONS

This application is a continuation of co-pending U.S. patent application Ser. No. 11/800,413, entitled DISTRIBUTING INFORMATION OVER A NETWORK filed May 4, 2007 which is incorporated herein by reference for all purposes, which claims priority to U.S. Provisional Patent Application No. 60/859,428 entitled CONTENT DISTRIBUTION filed Nov. 15, 2006 which is incorporated herein by reference for all purposes.

BACKGROUND OF THE INVENTION

Users are increasingly using networks such as the Internet to access content, such as video files and live streaming/video on demand content, via client machines. Such content is often large, time sensitive, or both. As demand for such content increases, there are challenges in distributing that content efficiently and with high quality.

Two ways that content owners can distribute content are by using their own servers or buying the service of a content delivery network (CDN). In the later case, content owners typically contract with CDNs to provide content to clients, e.g., in exchange for a fee. Requests by clients for content are directed to CDN nodes that are close by, e.g., the fewest hops away from the clients. The client then downloads the content from the appropriate CDN node. In both cases, content is distributed by servers, owned by either the content owner directly or the CDN. Unfortunately, as demand on server capacity increases (e.g., as the content size gets bigger and/or the number of requests to the content increase), meeting that demand by increasing capacity is often very expensive, requiring a larger number of servers or more powerful servers to be deployed.

Another way that content can be distributed is through use of peer-to-peer (P2P) systems. In a typical P2P scenario, a node downloads content from the system, and also uploads content to other nodes. In a hybrid content distribution system, a fraction of the content is transmitted by the servers and the rest is transmitted by nodes using their uplink capacity. Unfortunately, ISPs are facing increased network congestion from P2P and hybrid content distributions. One reason is that traditional P2P approaches rely on peers making independent routing decisions based on local information. This is approach is typically taken so that there is no single scalability bottleneck and no single point of failure. Unfortunately, such an approach may result in poor performance, inefficient resource utilization, and other shortcomings.

Therefore, it would be desirable to have a better way to distribute information over a network.

BRIEF DESCRIPTION OF THE DRAWINGS

Various embodiments of the invention are disclosed in the following detailed description and the accompanying drawings.

FIG. 9 is a representation of an example of a heartbeat.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
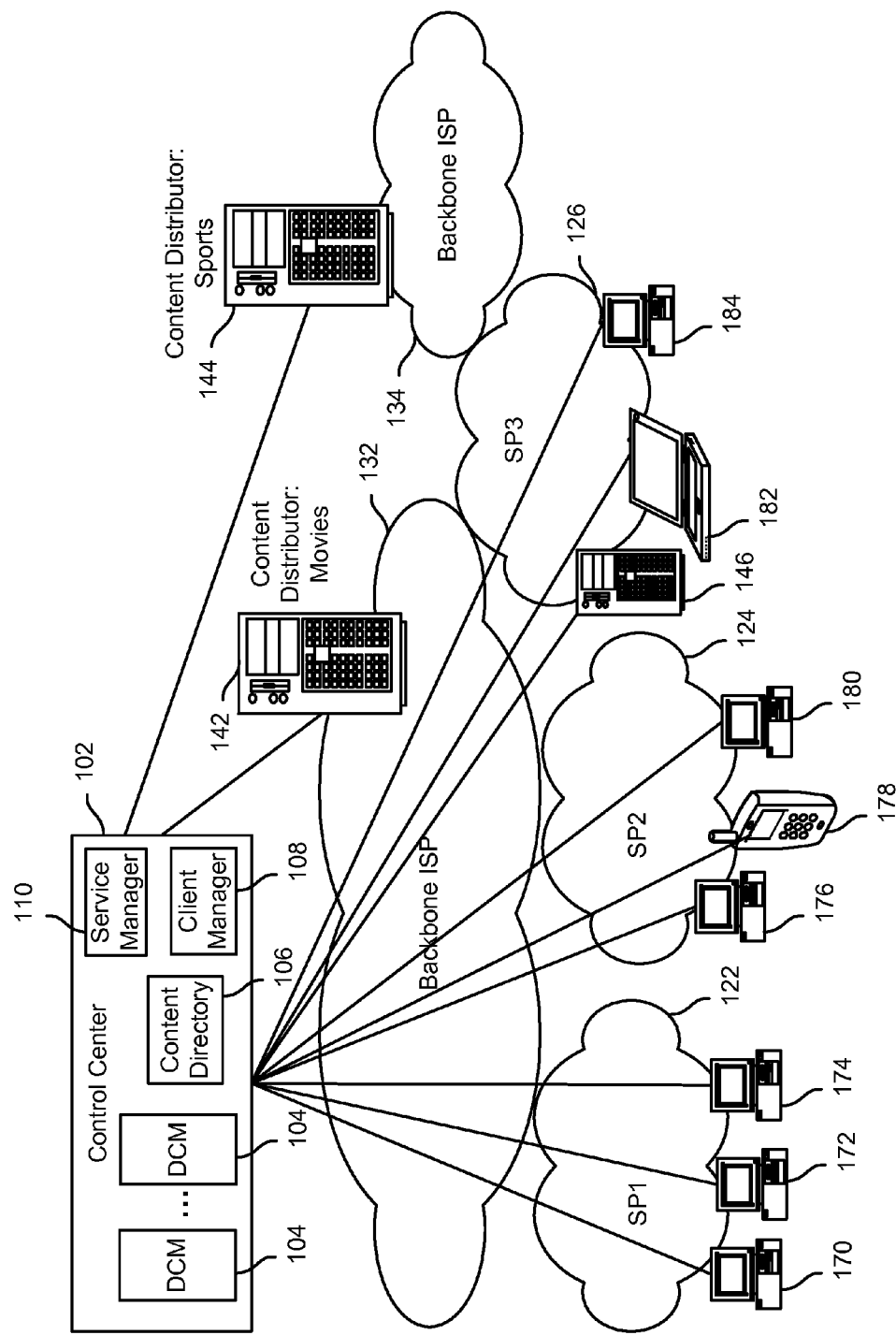
FIG. 1 is an illustration of an embodiment of a system for distributing information over a network.

FIG. 1 is an illustration of an embodiment of a system for distributing information over a network. In the example shown, clients 170-184 are used to access content, such as audiovisual content (e.g., movies, songs, television shows, sporting events, games, etc.) that is owned by content owners. Clients can include personal computers (e.g., 170), laptops (182), and cellular phones/personal digital assistants (178), as well as other types of information appliances (not shown) such as set-top boxes, game consoles, broadband routers, file servers, video servers, and digital video recorders, as applicable. As used herein, nodes can include clients and servers, all of which can be peers—such as neighbors, parents, and children.

The clients shown are used by subscribers to various Internet service providers (ISPs). For example, clients 170, 172, and 174 are subscribed to SP1 (122), while clients 176, 178, and 180 are subscribed to SP2 (124) and clients 182 and 184 are subscribed to SP3 (126).

One typical goal of content owners is for their content to reach their customers (who likely subscribe to different networks) in an efficient, economic manner. In the example shown, a movie studio has contracted with content distributor 142 to provide downloadable copies of its films. Similarly, a soccer league has contracted with content distributor 144 to provide season pass holders with access to live streams of matches.

Content distributor 142 has a data center that is provided with network access by backbone ISP 132. Though represented here by a single node (also referred to herein as a "CDN node"), content distributor 142 may typically have multiple data centers (not shown) and may make use of multiple backbone or other ISPs. Content distributor 144 has a data center that is provided with network access by backbone ISP 134.

Control center 102 gathers status information from nodes and dynamically constructs and adjusts distribution topologies among nodes. As described in more detail below, in some embodiments nodes provide lightweight heartbeats to control center 102 with information about their resource availability, their performance experience when downloading from or streaming to other clients, etc. The distribution topology constructed by control center 102 takes into consideration the network traffic implications of the peers it associates and can provide quality of service, cause resources to be used efficiently, converge quickly in the presence of network changes, and satisfy network-wide constraints. The control center sends commands back to the nodes instructing them where to obtain content, and including in some embodiments instructions indicating which protocols to use.

Suppose a user of client 170 desires to watch a soccer match live (as the game occurs) and to simultaneously download a movie for watching after the match ends. Control center 102 might optimize delivery of the live event over the delivery of the movie—selecting peers (and/or "neighbors" and/or "parents/children") accordingly.

In various embodiments, nodes run software that monitors resource availability and network congestion and implements data replication and forwarding. The coordinator may consider a variety and/or combination of factors such as network conditions and resource availability, which files are being distributed, the number of clients, the nature of the content (e.g., live event vs. file; free content vs. premium or ad supported content), and the nature of the client (e.g., whether the user has paid for premium service). The coordinator can also coordinate multiple file transfers to different nodes (e.g., where a user of client 176 wants to download the movie, a user of client 178 wants the sporting feed, and a user of client 180 wants both).

In the example shown, control center 102 includes a plurality of delivery coordinator managers (DCMs) 104, a content directory 106, a client manager 108, and a service manager 110. Client manager 108 receives heartbeats from nodes that include state information and in turn distributes information to other components. When a client requests content (such as might be triggered by a user clicking on a "watch today's soccer match live" link in a browser), the client contacts control center 102 to determine if a DCM is managing that content (also referred to herein as a "channel") in a region, consulting content directory 106. A region includes a set of nodes that are grouped by a variety of criteria including but not limited to network topology, geographic proximity, administrative domain (e.g., autonomous system, enterprise), and network technology (e.g., DSL, cable modems, fiber optic). If no DCM is currently responsible for the content, service manager 110 configures a DCM as appropriate. Once a DCM for the content and region that the client is in exists, the client is provided with instructions for downloading the content, e.g., from a specific pair of neighbors.

In the example shown, a single control center 102 is used. Portions of control center 102 may be provided by and/or replicated across various other modules or infrastructure depending, for example, on factors such as scalability and availability (reducing the likelihood of having a single point of failure), and the techniques described herein may be adapted accordingly. In some embodiments control center 102 is implemented across a set of machines distributed among several data centers. As described in more detail below, in some embodiments control center 102 uses a Resilience Service Layer (RSL) which ensures that the control center service is not disrupted when/if a subset of control machines fail or a subset of data centers hosting the control center are disconnected from the Internet.

Figure 2:
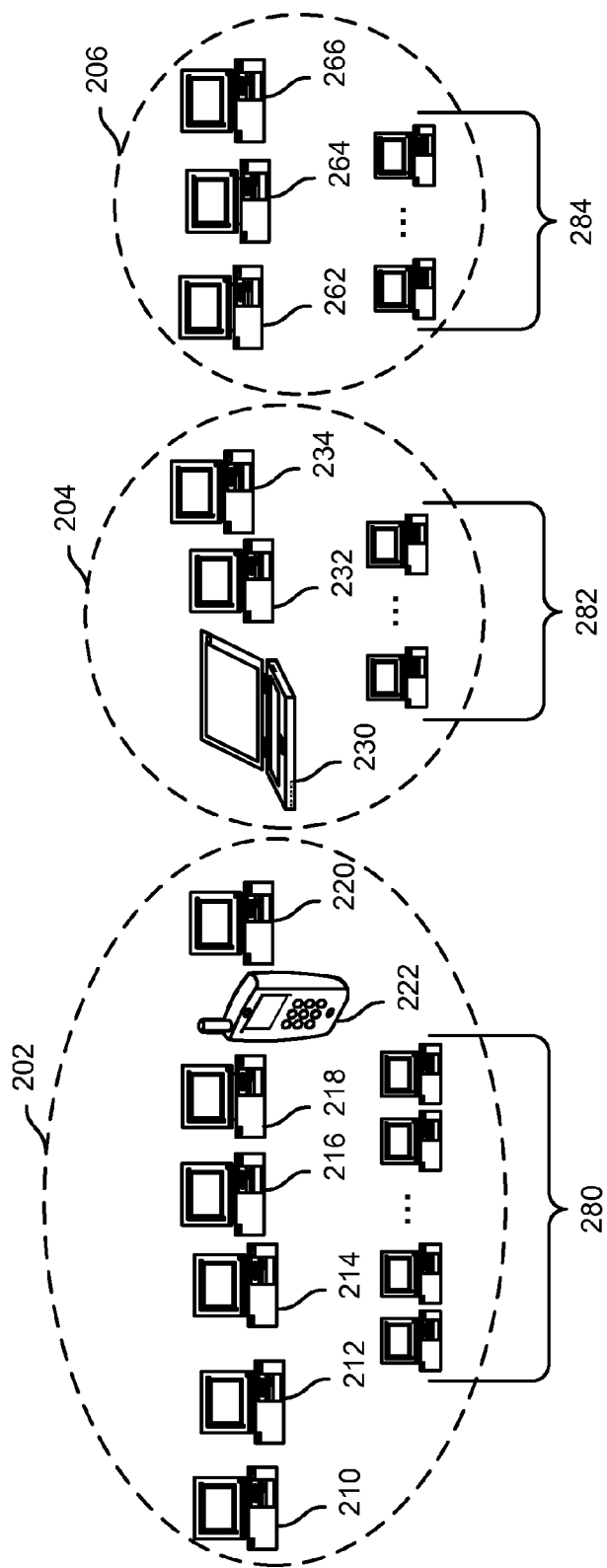
FIG. 2 is an illustration of nodes grouped into regions according to one embodiment.

FIG. 2 is an illustration of nodes grouped into regions according to one embodiment. Nodes are grouped into regions based on the natural network boundaries and policy domains. Examples of such regions include autonomous systems (AS)es, and large organizations such as universities. One goal of grouping nodes into regions is to optimize traffic within a region—such as by being in close proximity (and likely sharing a fast link), and/or by having similar characteristics (e.g. a group of DSL subscribers vs. a group of cable modem subscribers). The partitioning changes slowly over time, and can be efficiently replicated as needed. In the example shown, clients 210-222 and 280 are grouped into region 202, clients 230-234 and 282 are grouped into region 204, and clients 262-266 and 284 are grouped into region 206.

In some embodiments control center 102 implements a multi-scale decomposition (MSD) algorithm which partitions the computation of a large distribution topology into multiple computation tasks that manage a smaller number of peers (e.g., thousands to tens of thousands).

In the following examples described herein, MSD is used to organize all the nodes that subscribe to a channel (data stream) into a three-level hierarchy. The top two levels use distribution protocols that are optimized primarily for resilience, while the bottom level uses distribution protocols that optimize for efficiency. Robustness and efficient bandwidth utilization can be optimized for as applicable. In other embodiments, nodes are grouped into hierarchies of other depths. For example, in a two-level hierarchy nodes that might be collectively present in the top two tiers of a three-level hierarchy may be collapsed into a single top level, nodes that would be present in the second tier of a three-level hierarchy may be split between the two levels of the two-level hierarchy, or nodes that would be present in the second tier of a three-level hierarchy may all be relegated to the bottom level. Four-level and other hierarchies can be used and the techniques described herein adapted as applicable.

As described in more detail below, nodes occupying one level of the hierarchy may communicate using distribution algorithms different from nodes occupying another level of the hierarchy. Different groups of nodes may also communicate between levels (and at the lower levels amongst themselves) using protocols optimized for factors such as network conditions, resource usage, etc. For example, one top level node may communicate with a group of bottom level nodes using a protocol optimized for delivering information to clients that make use of dialup connections (where the bottom level nodes connect to the Internet using modems), while a group of bottom level nodes may communicate amongst themselves using a protocol optimized for communication among cable modem subscribers of a particular telecommunication company (where the bottom level nodes are all subscribers of that particular cable modem service).

Figure 3:
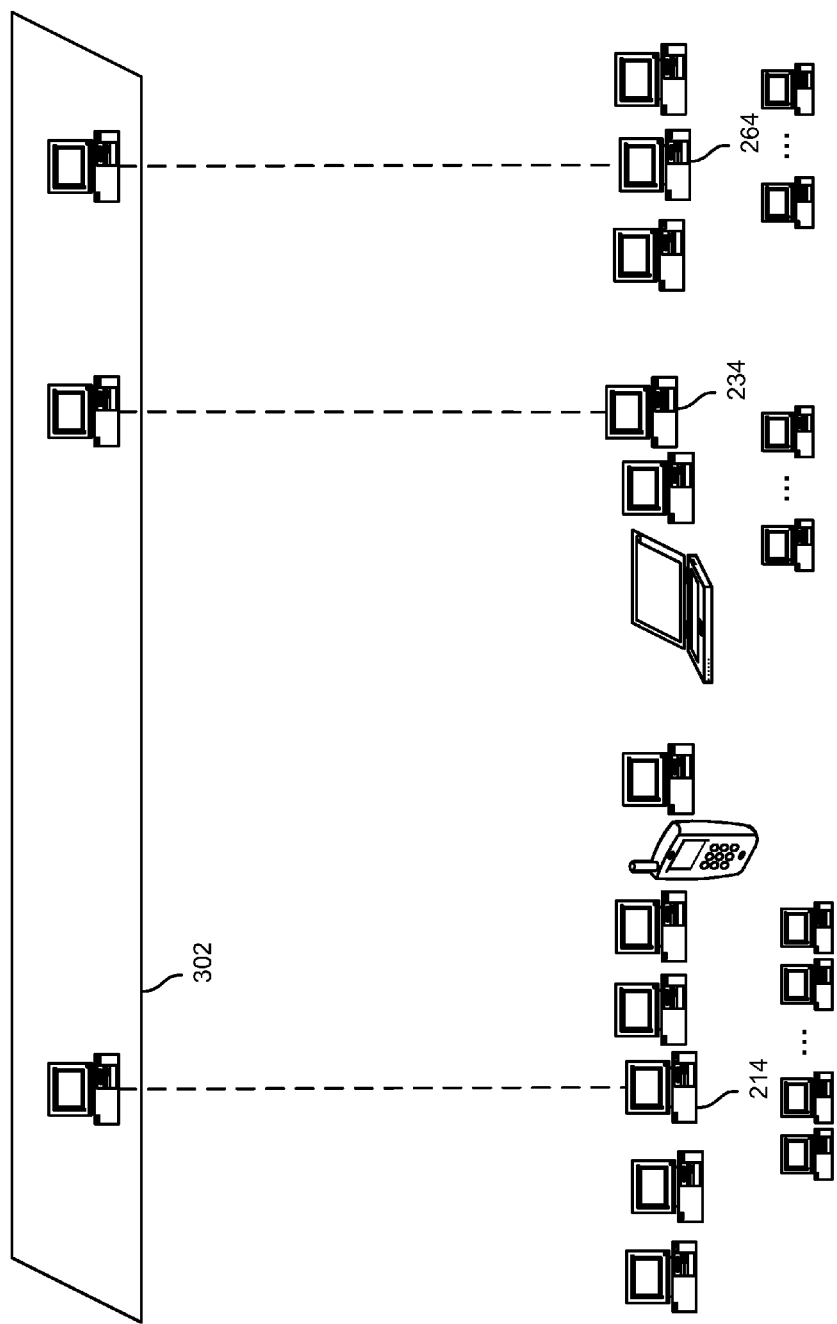
FIG. 3 is an illustration of nodes designated as preferred nodes according to one embodiment.

FIG. 3 is an illustration of nodes designated as preferred nodes according to one embodiment. In the example shown, nodes 214, 234, and 264 are designated by control center 102 as preferred nodes. They are included in the top level of a three-level hierarchy of nodes (302), which includes a few high capacity and stable nodes from each region (e.g., regions 280-284 as shown in FIG. 2) which has peers subscribing to the channel. In this example, high capacity nodes include nodes whose output capacity is larger than the rate of the data being distributed. In some embodiments, if a region has no high capacity nodes, nodes may be provided (e.g., by the entity that owns control center 102) on behalf of that region located in a data center close to that region. Such a node is referred to herein as a waypoint server. In the example shown in FIG. 1, waypoint server 146 has been provided by the owner of control center 102. The waypoint server can also be provided by a third-party. Nodes may also be provided by instructing high quality clients to obtain content that they would not otherwise request. For example, suppose the user of client 214 desires to watch a movie from content distributor 142 but is not interested in the soccer content provided by content distributor 144. If needed, in addition to serving as a preferred node for the movie content, client 214 can also be configured to serve as a preferred node for the sports content, as applicable. As described in more detail below, the nodes in tier 302 communicate with one another using a highly resilient protocol to deliver data with little degradation, even in the face of multiple simultaneous failures.

Figure 4:
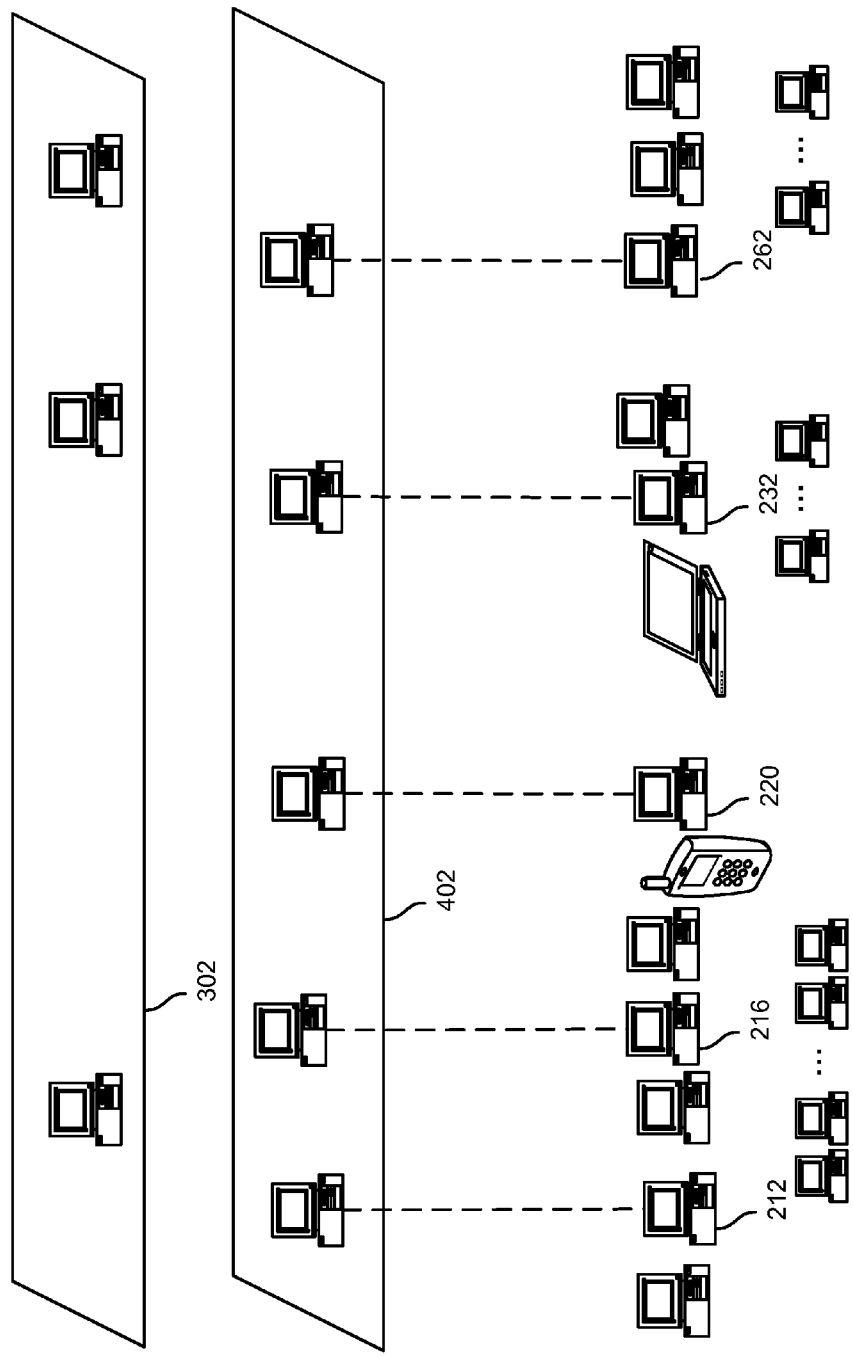
FIG. 4 is an illustration of nodes designated as second level nodes in a three-level hierarchy according to one embodiment.

FIG. 4 is an illustration of nodes designated as second level nodes in a three-level hierarchy according to one embodiment. The second level includes clusters connected to the top level. A cluster includes the high capacity nodes belonging to a single region. In the example shown, clients 212, 216, 220, 232, and 262 are included in the middle level of the three-level hierarchy of nodes (402). While the goal of the second level as with the first level is robustness, the degree of redundancy used at the second level (e.g., to ensure data delivery) is typically lower than at the top level. As described in more detail below in some embodiments the nodes in tier 402 communicate using a variant of the distribution protocol implemented in tier 302.

Figure 5:
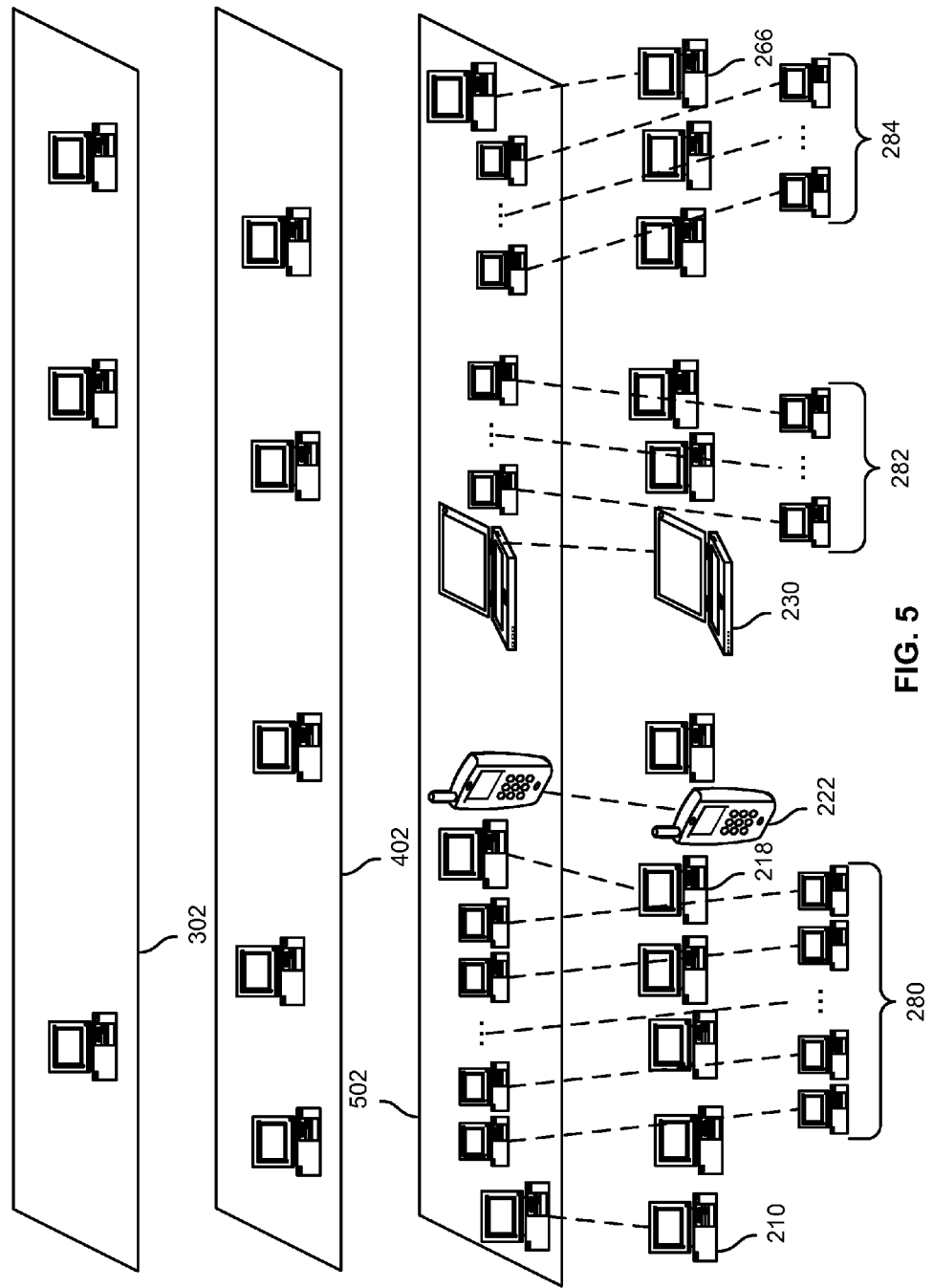
FIG. 5 is an illustration of nodes designated as common nodes in a three-level hierarchy according to one embodiment.

FIG. 5 is an illustration of nodes designated as common nodes in a three-level hierarchy according to one embodiment. In the example shown, nodes 210, 218, 222, 280, 230, 282, 284, and 266 are designated by control center 102 as common nodes. They are included in the bottom level of a three-level hierarchy of nodes (502), which includes mainly of low-capacity nodes (in this example, nodes whose output capacities are lower than the data rate). Each cluster of nodes in level 502 shares at least a few high capacity nodes with the second level, ensuring that each cluster has several high-quality data stream feeds. As described in more detail below, the distribution algorithm used among nodes in level 502 is optimized for efficient resource utilization.

Figure 6:
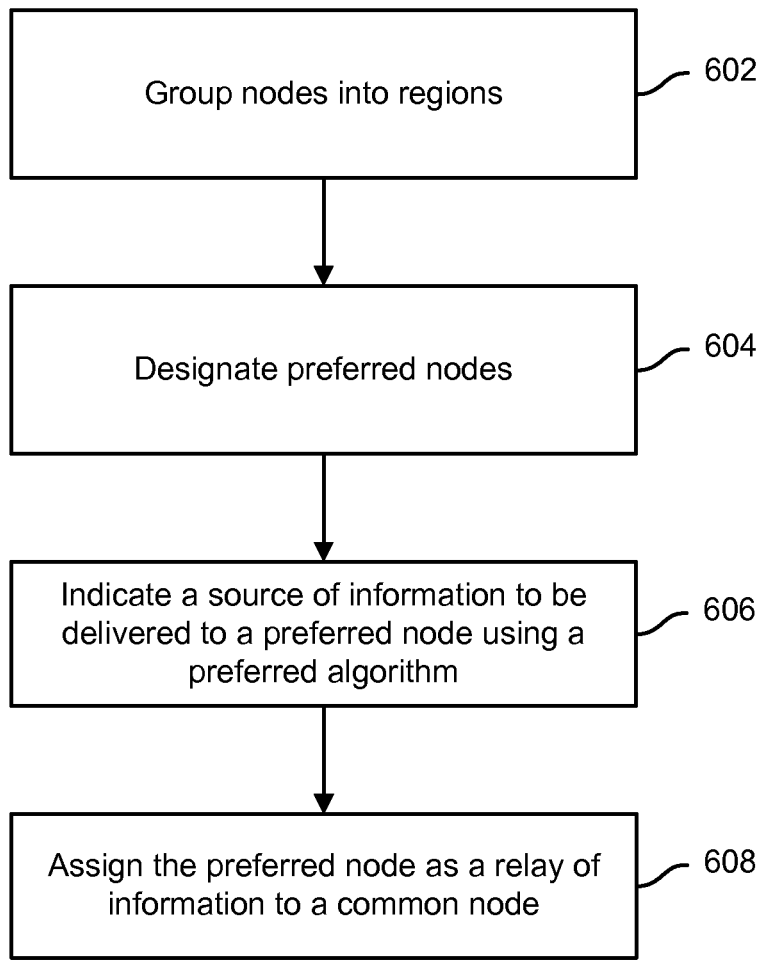
FIG. 6 is a flow chart illustrating an embodiment of a process for distributing information over a network.

FIG. 6 is a flow chart illustrating an embodiment of a process for distributing information over a network. The process begins at 602 when nodes are grouped into regions. In some embodiments the processing of portion 602 of FIG. 6 is performed by control center 102. In the example shown in FIG. 2, nodes 210-284 are grouped into regions at 602.

At 604 preferred nodes are designated. In some embodiments the processing of portion 604 of FIG. 6 is performed by control center 102. In the example shown in FIG. 3, nodes 214, 234, and 264 are designated as preferred nodes at 604.

At 606 a source of information to be delivered to a preferred node using a preferred algorithm is indicated. For example, at 606 node 214 (which is in possession of a full copy of a particular piece of content) is indicated as a source of that content to node 234. At 606, nodes having only portions of content may also be designated as sources of those portions of content. One example of a preferred algorithm is a flooding algorithm with duplicate elimination. The algorithm first creates an overlay mesh topology where the capacity of each virtual link is greater than the stream rate and the mesh forms a c-connected graph. When a node A receives a new packet, i.e., a packet that it has not seen so far, from neighbor N, node A sends a copy of the received packet to each of its neighbors, except N. This algorithm ensures that all nodes will get every packet sent by the source even when as many as c−1 nodes fail simultaneously. Another example of a preferred algorithm is a simple tree distribution algorithm, which might be used if all nodes at this level are highly stable.

At 608 the preferred node is assigned as a relay of information to a common node. For example, at 608 client 230 may be instructed to retrieve portions of content from node 220.

Figure 7:
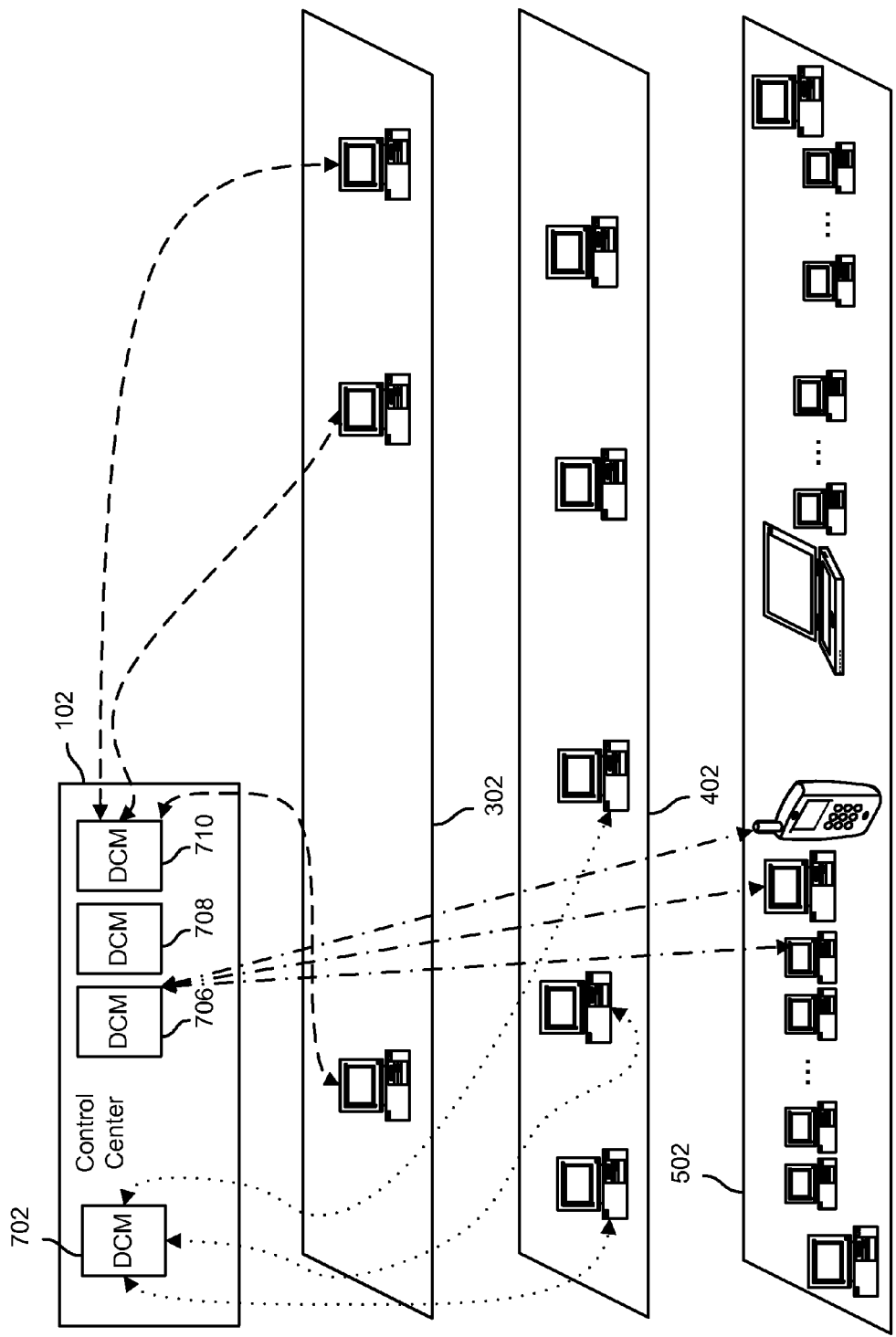
FIG. 7 is an illustration a representation of the management of nodes in a three-level hierarchy according to an embodiment.

FIG. 7 is an illustration a representation of the management of nodes in a three-level hierarchy according to an embodiment. In the example shown, all nodes in the top level (302) are managed by a single DCM such as DCM 710 (and as represented in FIG. 7 by dashed lines). One role of the DCM is to maintain an accurate distribution topology of the nodes at this level. The DCM computes the distribution topology based on the client available resources, the connectivity to the Internet (e.g., what kind of NAT/firewall the client is behind), congestion in the network, and various network-wide policies. In various embodiments, DCM 710 is logically a single DCM but is implemented across a plurality of physical DCMs.

In the example shown, each cluster of nodes in the third level (502) is managed by a DCM, such as DCM 706 (and as represented in FIG. 7 by dotted lines). The clusters change dynamically as nodes join and leave the distribution graph. Small clusters are dynamically merged, and large clusters are split. Since this level includes the vast majority of nodes in the data group, the distribution algorithm can be optimized for efficient resource utilization.

One example of an efficient distribution topology at the third level is a multi-tree. In the multi-tree case, the stream is divided into several substreams k, where substream i includes packets with sequence numbers k*j+1; j≥0. Each substream will have a rate of R/k, where R is the original stream rate. For each substream, the algorithm builds a sub-tree. Each node is an interior node in one sub-tree, and a leaf node in every other sub-trees. A multi-tree algorithm can use the upload capacity of a node as long as this capacity is larger than the sub-stream rate. The tree building algorithm can be optimized for various objective functions such as minimizing each sub-tree depth or minimizing the distance between the child and its parents (every node will have one parent in each sub-tree), and subject to the capacity constraints of the clients, and performance and policy constraints.

In some embodiments a multi-tree topology is built by building trees one at a time. To build such a tree, one could use a greedy algorithm that adds nodes to a sub-tree one by one, making sure that none of the additions violates the existing constraints. Several heuristics can be used to increase the probability that the greedy algorithm succeeds. An example of such heuristic is to select the node with the highest capacity, or fewest constraints, to add next.

In the example shown, each cluster of nodes in the second level (402) is managed by a DCM, such as DCM 702 (and as represented in FIG. 7 by the dotted dashed line). One goal of the distribution algorithm at the second level is to maintain quality of service, even if this incurs a higher overhead. An example of a distribution algorithm used by level 402 is to modify the multi-tree algorithm used at level 502 as follows. Instead of splitting the stream into k substreams, the algorithm uses erasure codes to create k+n substreams, such that any k substreams out of the n+k substreams would be enough to reconstruct the original stream. The algorithm takes each group of k consecutive packets (i.e., packets with sequence numbers k*j, k*j+1, . . . , k*j+n−1; j≥0), and uses erasure codes to create k+n packets such that receiving any k packets will be enough to reconstruct the original k packets. The algorithm constructs a sub-tree for each sub-stream similar to the multi-tree algorithm at the third level.

In some embodiments the algorithms running in different clusters of level 402 use different redundancy factors to account for the quality of the underlying network. For example, if all hosts in a cluster at the second level are in Japan a low redundancy factor can be used, while if all hosts are in India a higher redundancy factor might be used (as the network is in general less reliable). Similarly, a higher redundancy factor could be used for a deployment in a cable modem environment relative to a DSL environment.

Figure 8:
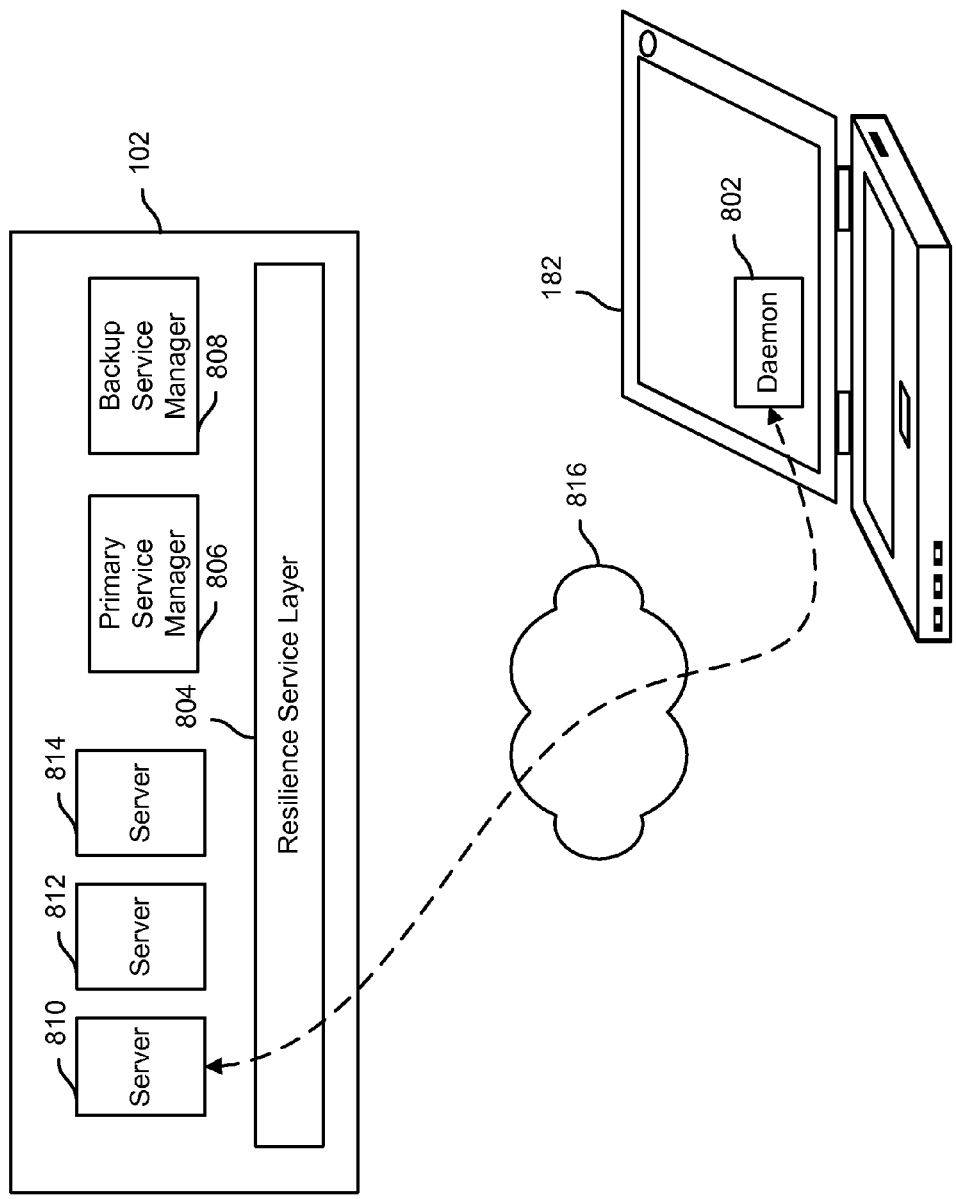
FIG. 8 is an illustration of an embodiment of a system having resilience.

FIG. 8 is an illustration of an embodiment of a system having resilience. When client 182 starts (e.g., after booting), daemon 802 is initiated, which communicates information between client 182 and control center 102. In the example shown, control center 102 includes servers 810-814 each of which runs services such as by providing DCM functionality. Each DCM is mapped by a logical identifier. Resilience Service Layer (RSL) 804 maintains mappings between servers 810-814 and their logical identifiers. If RSL 804 detects that a server, such as server 810 has failed, the RSL maps another DCM (such as a backup DCM or spare DCM not pictured) to that logical identifier. Similarly, if primary service manager 806 fails, it is replaced by backup service manager 808.

From the perspective of a client, such as client 188, a failover from DCM 810 to its replacement is transparent. Clients, such as client 188, periodically provide their state to DCMs (e.g., through heartbeats sent via network 816), and thus if a DCM fails (and is replaced), the replacement DCM is provided by the client with state information that indicates to the replacement DCM such details as the neighbors from/to which the client is exchanging content.

FIG. 9 is a representation of an example of a heartbeat. The heartbeat messages contain all necessary information required by the DCM to construct a global view of the distribution topology. In some embodiments each heartbeat message sent by node A contains the sequence numbers of the last packets received by A from each of its parents, as well as the sequence numbers of the last packets sent by A to each of its children. This information allows the DCM not only to construct the distribution topology, but also to determine which links are congested by comparing the sequence numbers of the packets sent/received by every node at the end of every heartbeat interval. In the example shown, heartbeat 900 includes the following information. The ClientID is a unique identifier of the client sending the heartbeat. The Heartbeat Seq is the sequence number of the heartbeat. P1, . . . , Pk represent the list of parents of ClientID. Parent Pi sends stream i to ClientID, where $1 \le i \le k$. C1, . . . , Cm represent the list of children of ClientID. The Local Timestamp is the timestamp at the client at the time the heartbeat was generated. Buffersize Si is the current buffer size for stream i, where $1 \le i \le k$. Timestamp TPi is the timestamp of the last packet received from parent Pi. Timestamp CTj is the timestamp of the last packet sent to child Cj, where $1 \le j \le m$.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, including:
   a set of one or more processors configured to, using a set of one or more interfaces:
      group a set of nodes into one or more regions;
      designate a subset of the nodes in the set of nodes as preferred nodes;
      transmit instructions to a preferred node, wherein the instructions indicate:
         a source of content to be delivered to the preferred node; and
         a preferred algorithm to be used in delivering the content to the preferred node;
      assign the preferred node as a relay of information to a node designated as a common node, wherein the information relayed from the preferred node to the common node is a portion of a first content; and
      cause the common node to receive a portion of a second content simultaneously with receipt by the common node of the portion of the first content.

2. The system of claim 1 wherein the information relayed from the preferred node to the common node is relayed using an algorithm other than the preferred algorithm.

3. The system of claim 1 wherein the preferred algorithm optimizes for robustness over efficiency.

4. The system of claim 1 wherein an algorithm used to relay information from the preferred node to the common node is based at least in part on a region into which the common node is grouped.

5. The system of claim 1 wherein information is relayed to the common node using an algorithm optimized for efficiency over robustness.

6. The system of claim 1 wherein the preferred nodes are of a first type, and wherein the set of one or more processors is further configured to designate preferred nodes of a second type.

7. The system of claim 1 wherein the set of one or more processors is further configured to select a delivery algorithm to be used between two nodes.

8. The system of claim 1 wherein at least one of the regions into which nodes are grouped is associated with a delivery coordinator manager.

9. The system of claim 1 wherein each region into which nodes are grouped is associated with a delivery coordinator manager.

10. The system of claim 1 wherein nodes are designated as preferred nodes based at least in part on their historical performance.

11. The system of claim 1 wherein the set of one or more processors is further configured to detect a failure of a first delivery coordinator manager and reassociate nodes associated with the failed delivery coordinator manager with a second delivery coordinator manager.

12. The system of claim 11 wherein the second delivery coordinator manager is configured to reconstruct state information from heartbeats provided by nodes.

13. The system of claim 11 wherein the nodes are reassociated with the second delivery coordinator manager unobtrusively.

14. The system of claim 1 wherein the nodes are configured to transmit a heartbeat that includes state information.

15. The system of claim 1 wherein the nodes that have been grouped into a region are in possession of a logical identifier of a delivery coordinator manager.

16. The system of claim 1 wherein nodes are grouped into prespecified regions based on policies and last known characteristics of the nodes.

17. The system of claim 1 wherein at least one of the preferred nodes is owned by a third party.

18. The system of claim 1 wherein the set of one or more processors is further configured to evaluate nodes for selection as preferred nodes on a recurring basis.

19. The system of claim 1 wherein the portion of the first content relayed from the preferred node to the common node is a portion of content which a user of the common node wishes to consume, and which no user of the preferred node wishes to consume.

20. The system of claim 1 wherein at least one of the preferred nodes is a client.

21. The system of claim 1 wherein at least one of the preferred nodes is a server.

22. A method, comprising:
grouping, using a set of one or more processors, a set of nodes into one or more regions;
designating, using the set of one or more processors, a subset of the nodes as preferred nodes;
transmitting, via a set of one or more interfaces, instructions to a preferred node, wherein the instructions indicate:
a source of content to be delivered to the preferred node; and
a preferred algorithm to be used in delivering the content to the preferred node;
assigning, using the set of one or more processors, the preferred node as a relay of information to a node designated as a common node, wherein the information relayed from the preferred node to the common node is a portion of a first content; and
causing, using the set of one or more processors, the common node to receive a portion of a second content simultaneously with receipt by the common node of the portion of the first content.

23. The method of claim 22 wherein the information relayed from the preferred node to the common node is relayed using an algorithm other than the preferred algorithm.

24. The method of claim 22 wherein the preferred algorithm optimizes for robustness over efficiency.

25. The method of claim 22 wherein an algorithm used to relay information from the preferred node to the common node is based at least in part on a region into which the common node is grouped.

26. The method of claim 22 wherein information is relayed to the common node using an algorithm optimized for efficiency over robustness.

27. The method of claim 22 wherein the preferred nodes are of a first type, and further comprising designating preferred nodes of a second type.

28. The method of claim 22 further comprising selecting a delivery algorithm to be used between two nodes.

29. The method of claim 22 wherein at least one of the regions into which nodes are grouped is associated with a delivery coordinator manager.

30. The method of claim 22 wherein each region into which nodes are grouped is associated with a delivery coordinator manager.

31. The method of claim 22 wherein nodes are designated as preferred nodes based at least in part on their historical performance.

32. The method of claim 22 further comprising detecting a failure of a first delivery coordinator manager and reassociating nodes associated with the failed delivery coordinator manager with a second delivery coordinator manager.

33. The method of claim 32 wherein the second delivery coordinator manager is configured to reconstruct state information from heartbeats provided by nodes.

34. The method of claim 32 wherein the nodes are reassociated with the second delivery coordinator manager unobtrusively.

35. The method of claim 22 wherein the nodes are configured to transmit a heartbeat that includes state information.

36. The method of claim 22 wherein the nodes that have been grouped into a region are in possession of a logical identifier of a delivery coordinator manager.

37. The method of claim 22 wherein nodes are grouped into prespecified regions based on policies and last known characteristics of the nodes.

38. The method of claim 22 wherein at least one of the preferred nodes is owned by a third party.

39. The method of claim 22 further comprising evaluating nodes for selection as preferred nodes on a recurring basis.

40. The method of claim 22 wherein the portion of the first content relayed from the preferred node to the common node is a portion of content which a user of the common node wishes to consume, and which no user of the preferred node wishes to consume.

41. The method of claim 22 wherein at least one of the preferred nodes is a client.

42. The method of claim 22 wherein at least one of the preferred nodes is a server.

43. A system, including:
a set of one or more processors configured to, using a set of one or more interfaces:
group a set of nodes into one or more regions;
designate a subset of the nodes in the set of nodes as preferred nodes;
transmit instructions to a preferred node, wherein the instructions indicate:
a source of content to be delivered to the preferred node; and
a preferred algorithm to be used in delivering the content to the preferred node; and
assign the preferred node as a relay of information to a node designated as a common node, wherein the information relayed from the preferred node to the common node is a portion of content which a user of the common node wishes to consume, and which no user of the preferred node wishes to consume.

44. The system of claim 43 wherein the information relayed from the preferred node to the common node is relayed using an algorithm other than the preferred algorithm.

45. The system of claim 43 wherein the preferred algorithm optimizes for robustness over efficiency.

46. The system of claim 43 wherein an algorithm used to relay information from the preferred node to the common node is based at least in part on a region into which the common node is grouped.

47. The system of claim 43 wherein information is relayed to the common node using an algorithm optimized for efficiency over robustness.

48. The system of claim 43 wherein the preferred nodes are of a first type, and wherein the set of one or more processors is further configured to designate preferred nodes of a second type.

49. The system of claim 43 wherein the set of one or more processors is further configured to select a delivery algorithm to be used between two nodes.

50. The system of claim 43 wherein at least one of the regions into which nodes are grouped is associated with a delivery coordinator manager.

51. The system of claim 43 wherein each region into which nodes are grouped is associated with a delivery coordinator manager.

52. The system of claim 43 wherein nodes are designated as preferred nodes based at least in part on their historical performance.

53. The system of claim 43 wherein the set of one or more processors is further configured to detect a failure of a first delivery coordinator manager and reassociate nodes associated with the failed delivery coordinator manager with a second delivery coordinator manager.

54. The system of claim 53 wherein the second delivery coordinator manager is configured to reconstruct state information from heartbeats provided by nodes.

55. The system of claim 53 wherein the nodes are reassociated with the second delivery coordinator manager unobtrusively.

56. The system of claim 43 wherein the nodes are configured to transmit a heartbeat that includes state information.

57. The system of claim 43 wherein the nodes that have been grouped into a region are in possession of a logical identifier of a delivery coordinator manager.

58. The system of claim 43 wherein nodes are grouped into prespecified regions based on policies and last known characteristics of the nodes.

59. The system of claim 43 wherein at least one of the preferred nodes is owned by a third party.

60. The system of claim 43 wherein the set of one or more processors is further configured to evaluate nodes for selection as preferred nodes on a recurring basis.

61. The system of claim 43 wherein the portion of content relayed from the preferred node to the common node is a portion of a first content and wherein the set of one or more processors is further configured to cause the common node to receive a portion of a second content simultaneously with receipt by the common node of the portion of the first content.

62. The system of claim 43 wherein at least one of the preferred nodes is a client.

63. The system of claim 43 wherein at least one of the preferred nodes is a server.

64. A method, comprising:
grouping, using a set of one or more processors, a set of nodes into one or more regions;
designating, using the set of one or more processors, a subset of the nodes as preferred nodes;
transmitting, via a set of one or more interfaces, instructions to a preferred node, wherein the instructions indicate:
a source of content to be delivered to the preferred node; and
a preferred algorithm to be used in delivering the content to the preferred node; and
assigning, using the set of one or more processors, the preferred node as a relay of information to a node designated as a common node, wherein the information relayed from the preferred node to the common node is a portion of content which a user of the common node wishes to consume, and which no user of the preferred node wishes to consume.

65. The method of claim 64 wherein the information relayed from the preferred node to the common node is relayed using an algorithm other than the preferred algorithm.

66. The method of claim 64 wherein the preferred algorithm optimizes for robustness over efficiency.

67. The method of claim 64 wherein an algorithm used to relay information from the preferred node to the common node is based at least in part on a region into which the common node is grouped.

68. The method of claim 64 wherein information is relayed to the common node using an algorithm optimized for efficiency over robustness.

69. The method of claim 64 wherein the preferred nodes are of a first type, and further comprising designating preferred nodes of a second type.

70. The method of claim 64 further comprising selecting a delivery algorithm to be used between two nodes.

71. The method of claim 64 wherein at least one of the regions into which nodes are grouped is associated with a delivery coordinator manager.

72. The method of claim 64 wherein each region into which nodes are grouped is associated with a delivery coordinator manager.

73. The method of claim 64 wherein nodes are designated as preferred nodes based at least in part on their historical performance.

74. The method of claim 64 further comprising detecting a failure of a first delivery coordinator manager and reassociating nodes associated with the failed delivery coordinator manager with a second delivery coordinator manager.

75. The method of claim 74 wherein the second delivery coordinator manager is configured to reconstruct state information from heartbeats provided by nodes.

76. The method of claim 74 wherein the nodes are reassociated with the second delivery coordinator manager unobtrusively.

77. The method of claim 64 wherein the nodes are configured to transmit a heartbeat that includes state information.

78. The method of claim 64 wherein the nodes that have been grouped into a region are in possession of a logical identifier of a delivery coordinator manager.

79. The method of claim 64 wherein nodes are grouped into prespecified regions based on policies and last known characteristics of the nodes.

80. The method of claim 64 wherein at least one of the preferred nodes is owned by a third party.

81. The method of claim 64 further comprising evaluating nodes for selection as preferred nodes on a recurring basis.

82. The method of claim 64 wherein the portion of content relayed from the preferred node to the common node is a portion of a first content, and further comprising causing the common node to receive a portion of a second content simultaneously with receipt by the common node of the portion of the first content.

83. The method of claim 64 wherein at least one of the preferred nodes is a client.

84. The method of claim 64 wherein at least one of the preferred nodes is a server.

* * * * *